US012006621B2

(12) United States Patent
Mora et al.

(10) Patent No.: US 12,006,621 B2
(45) Date of Patent: Jun. 11, 2024

(54) WASHER APPLIANCE HAVING DOOR WITH REMOVABLE SERVICE TRAY

(71) Applicant: Haier US Appliance Solutions, Inc., Wilmington, DE (US)

(72) Inventors: Adam Raymond Mora, La Grange, KY (US); Venkata Chakradhar Rangu, Louisville, KY (US); Neelapala Gopinath Yadav, Hyderabad (IN)

(73) Assignee: Haier US Appliance Solutions, Inc., Wilmington, DE (US)

(*) Notice: Subject to any disclaimer, the term of this patent is extended or adjusted under 35 U.S.C. 154(b) by 173 days.

(21) Appl. No.: 17/389,512

(22) Filed: Jul. 30, 2021

(65) Prior Publication Data

US 2023/0029923 A1 Feb. 2, 2023

(51) Int. Cl.

| | |
|---|---|
| ***D06F 39/14*** | (2006.01) |
| ***D06F 23/04*** | (2006.01) |
| ***D06F 37/24*** | (2006.01) |
| ***E05F 1/12*** | (2006.01) |

(52) U.S. Cl.

CPC .............. *D06F 39/14* (2013.01); *D06F 23/04* (2013.01); *D06F 37/24* (2013.01); *E05F 1/1207* (2013.01); *E05Y 2900/312* (2013.01)

(58) Field of Classification Search

CPC .......... D06F 39/14; D06F 23/04; D06F 37/24; E05F 1/1207; E05Y 2900/312

USPC ........................................................... 68/131

See application file for complete search history.

(56) References Cited

U.S. PATENT DOCUMENTS

2012/0007482 A1* 1/2012 Pillot ..................... D06F 37/28 312/228

FOREIGN PATENT DOCUMENTS

| | | | |
|---|---|---|---|
| JP | 4462362 | B2 | 5/2010 |
| JP | 6349274 | B2 | 6/2018 |
| JP | 2020103957 | A | 7/2020 |
| JP | 6742147 | B2 | 8/2020 |
| WO | WO2018042962 | A1 | 3/2018 |

OTHER PUBLICATIONS

JP2020103957A—machine translation (Year: 2020).*

* cited by examiner

*Primary Examiner* — Tinsae B Ayalew

(74) *Attorney, Agent, or Firm* — Dority & Manning, P.A.

(57) ABSTRACT

A washing appliance having a removable service tray. The tray may include a cartridge removably received within a door of the appliance. A spring assembly may be positioned within the cartridge for assisting in opening the door. The cartridge and its components may be concealed from the view of a user at the front of the appliance.

16 Claims, 8 Drawing Sheets

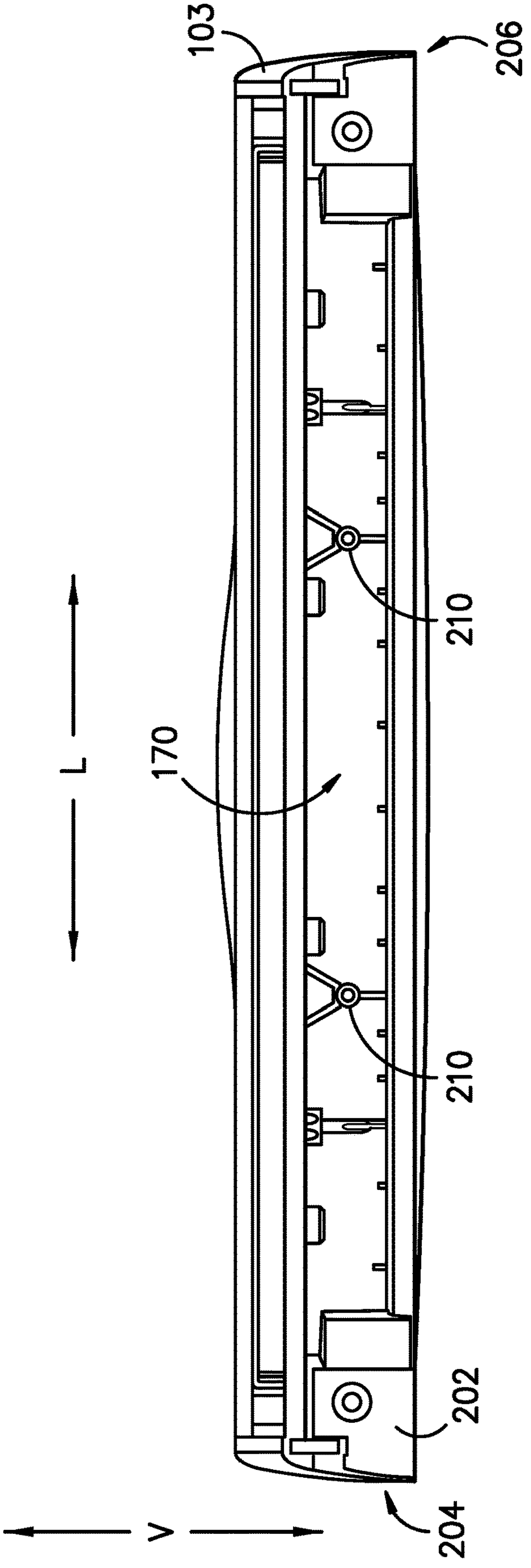
FIG. –7–

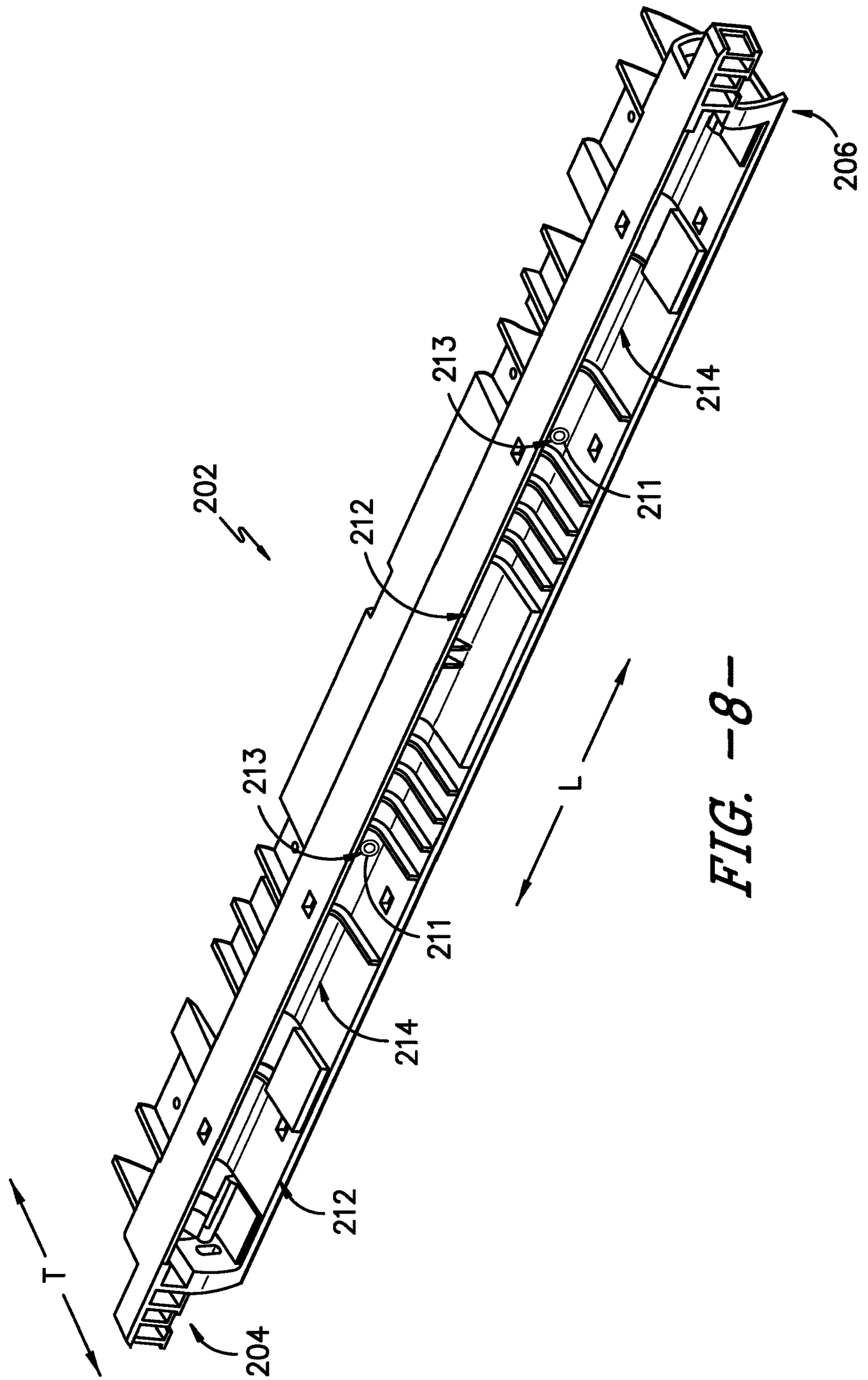
FIG. –8–

WASHER APPLIANCE HAVING DOOR WITH REMOVABLE SERVICE TRAY

FIELD OF THE INVENTION

The subject matter of the present disclosure relates generally to a washer appliance having a door with a removable service tray.

BACKGROUND OF THE INVENTION

Washing appliances (also referred to as "washing machines") typically include a drum or basket for receipt of articles (e.g., laundry) to be washed. Top-load or vertical axis washing machines rotate the drum about the vertical axis at various points during the cleaning cycle. Various components provide for adding fluid into the drum and for imparting motion to the fluid and articles being washed in order to clean the articles.

Conventionally, the washing appliance may include a knob or other switch by which the user selects the level of fluid in the vertical axis washing machine based on e.g., the load size of articles being washed. The user may visually determine the desired fluid level based on the anticipated load size. Some washing appliances may determine the required fluid levels automatically.

Many washing appliance users are also accustomed to seeing a conventional agitator in the form of a post extending up from the bottom of the wash basket and configured to impart motion to the fluid and articles during the cleaning cycles. Users may associate factors such as fluid level and movement of the agitator as directly related to the effective cleaning of the articles and may believe that increased fluids levels and agitator action are advantageous.

Vertical axis washing machines may be equipped with a door or lid that covers an opening leading to the wash basket. The door can be opened in order to add or remove articles into the wash basket. The door can be closed to cover the opening and prevent access to the wash basket while a cleaning cycle is operating.

Certain users may prefer a door through which the contents of the wash basket may be viewed while a cleaning cycle of the washing appliance is operating. Such may allow the user to e.g., check the level of articles and wash fluid during a cycle and otherwise observe the operation of the appliance. Accordingly, the washing appliance may be equipped with a door that is all or partly constructed from glass or other transparent material through which the user may look into the wash basket.

As a convenience to the user, features may be provided to assist with opening and closing the door. The door may be relatively heavy, particularly if constructed from a transparent material such as glass. Features may be included that assist with lifting the door, lowering the door, or both. These features, however, require space and incorporating such into the appliance creates challenges. For example, providing such features at locations readily accessible for servicing or repair may create aesthetics that are unacceptable to the user. Conversely, there is limited space available in which to hide or conceal such features from view.

Accordingly, a washing appliance with a door that includes one or more features that can assist with opening, closing, or both, would be beneficial. Such an appliance that can incorporate such features in a manner that is aesthetically acceptable while providing accessibility for service and repair would be particularly beneficial.

BRIEF DESCRIPTION OF THE INVENTION

Additional aspects and advantages of the invention will be set forth in part in the following description, or may be apparent from the description, or may be learned through practice of the invention.

In one exemplary embodiment, the present invention provides a washing appliance that includes a cabinet defining a vertical direction, a lateral direction extending between opposing sides, and a transverse direction extending between a front and back. A wash tub is positioned in the cabinet and defines a wash chamber accessed through an opening positioned over the wash chamber. A wash drum is rotatably mounted within the wash chamber and is configured for receiving articles for washing. A door is positioned at the opening, the door configured for selectively pivoting between an open position allowing access to the wash chamber through the opening and a closed position in which the door covers the opening.

A cartridge may be removably received onto the door. The cartridge can define a rear-facing opening providing access to a cartridge interior. The cartridge may extend longitudinally along the lateral direction between opposing ends. A plurality of fasteners may be positioned in the interior of the cartridge and releasably attach the cartridge with the door. A pair of rotatable stanchions may be positioned at the opposing ends of the cartridge. The stanchions may be removably connected with the cabinet. A spring assembly may be positioned within the interior of the cartridge and connected with the pair of rotatable stanchions. The spring assembly may be configured to assist in moving the door to the open position.

In another exemplary embodiment, the present invention provides a washing appliance that includes a cabinet and a wash tub supported by the cabinet and defining a wash chamber accessed through an opening positioned over the wash chamber. A wash drum may be rotatably mounted within the wash chamber and configured for receiving articles for washing. A door can be positioned at the opening, the door configured for selectively pivoting between an open position and a closed position.

A cartridge may be removably attached to the door, the cartridge having a top surface covered at least partially by the door, the cartridge having a cartridge interior, the cartridge extending longitudinally along a lateral direction between opposing ends. At least one fastener may releasably attach the cartridge with the door. A pair of rotatable stanchions may be positioned at the opposing ends of the cartridge. The stanchions may be removably connected with the cabinet. A spring assembly may be positioned within the cartridge interior and connected with the pair of rotatable stanchions, wherein the spring assembly provides assistance in moving the door to the open position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 7 is a rear view of the exemplary door of FIG. 3 with the exemplary service tray removed.

FIG. 8 is a perspective view of an exemplary removable cartridge of the present invention.

The use of the same or similar reference numbers in the figures denotes same or similar features unless the context indicates otherwise.

DETAILED DESCRIPTION OF THE INVENTION

Figure 1:
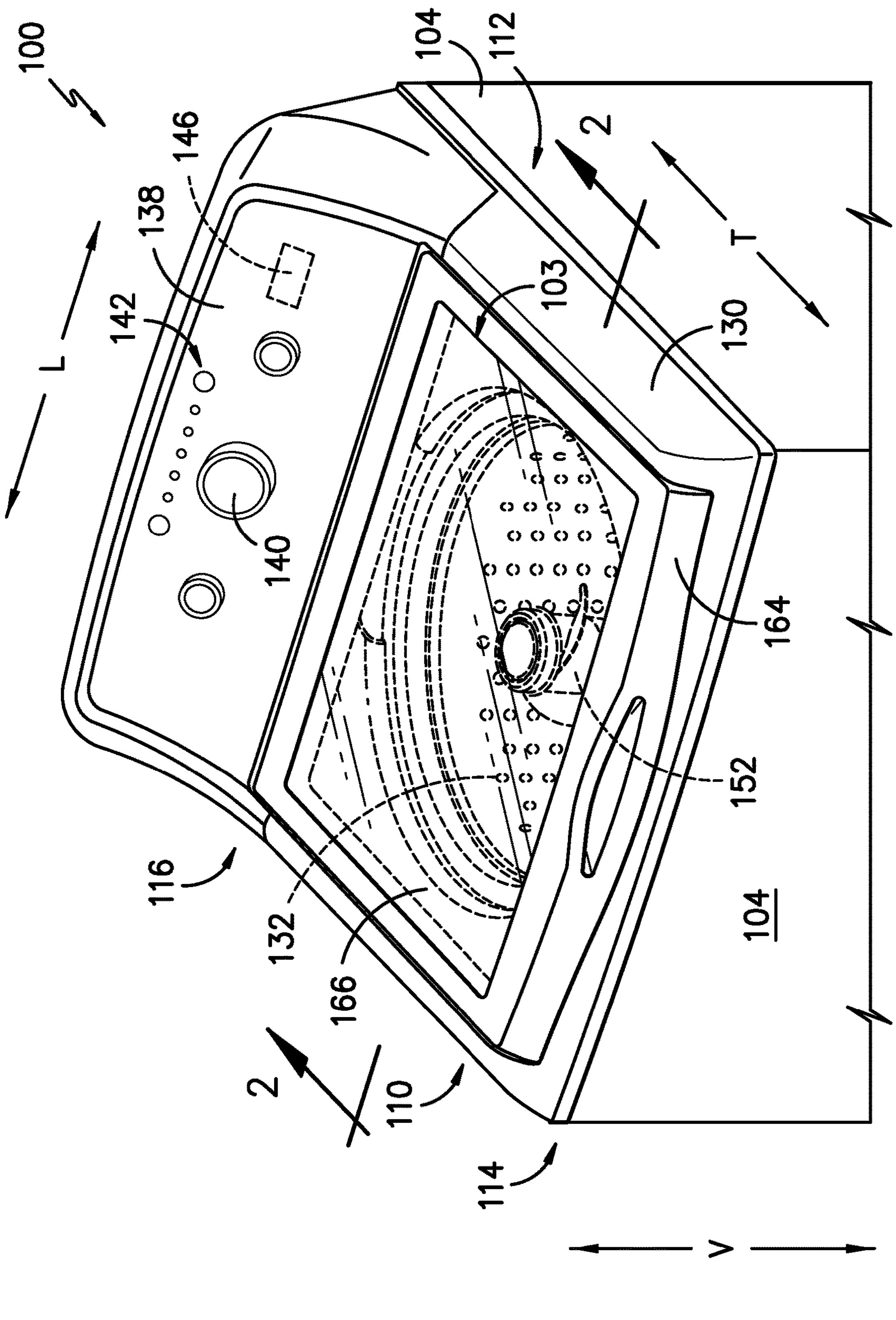
FIG. 1 provides a partial perspective view of an exemplary embodiment of a washing machine of the present invention.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations.

Figure 2:
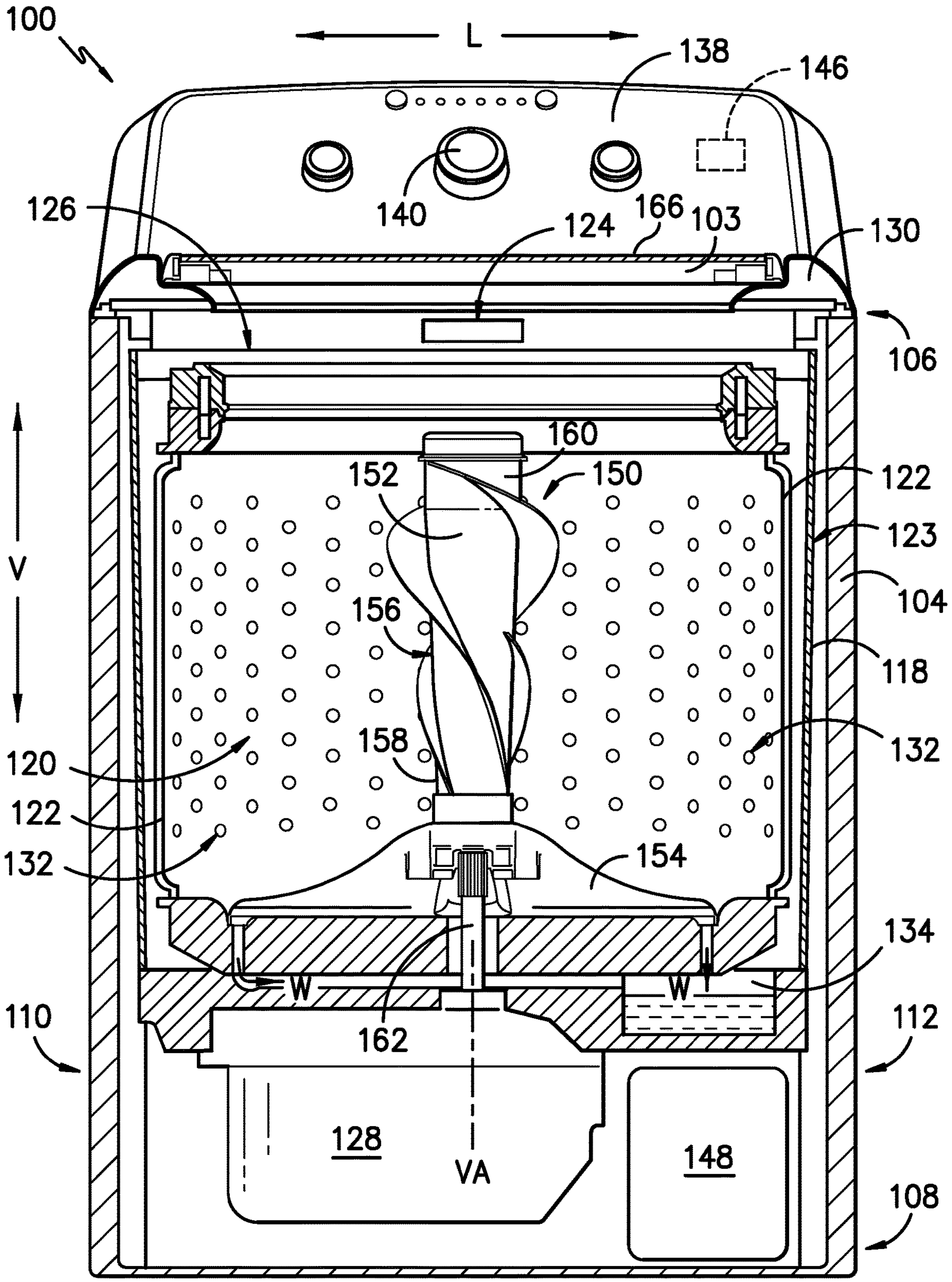
FIG. 2 provides a front cross-sectional view of the exemplary washing machine of FIG. 1.

FIGS. 1 and 2 illustrate an exemplary embodiment of a vertical axis washing appliance 100 of the present invention, which is also sometimes referred to as a top loading or vertical axis washing machine. The present invention is not limited to the particular vertical axis washing appliance 100 shown in the figures. Using the teachings disclosed herein, one or skill in the art will understand the other embodiments of a washing machine are also in the scope of the present invention.

Washing machine appliance 100 has a cabinet 104 that extends between a top portion 106 and a bottom portion 108 along the vertical direction V, between a first side (left) 110 and a second side (right) 112 (collectively "opposing sides") along the lateral direction L, and between a front 114 and a rear 116 along the transverse direction T. Cabinet 104 is generally configured for containing and/or supporting various components of appliance 100 and may also define one or more internal chambers or compartments of appliance 100. In this regard, as used herein, the terms "cabinet," "housing," and the like are generally intended to refer to an outer frame or support structure for appliance 100, e.g., including any suitable number, type, and configuration of support structures formed from any suitable materials, such as a system of elongated support members, a plurality of interconnected panels, or some combination thereof. It should be appreciated that cabinet 102 does not necessarily require an enclosure and may simply include open structure supporting various elements of appliance 100. By contrast, cabinet 102 may enclose some or all portions of an interior of cabinet 102 and may include a top panel 130. It should be appreciated that cabinet 102 may have any suitable size, shape, and configuration while remaining within the scope of the present subject matter.

As best shown in FIG. 2, a wash tub 118 is positioned within cabinet 102, defines a wash chamber 120, and is generally configured for retaining wash fluids during an operating cycle. A wash drum 122 is rotatably mounted within wash chamber 120 of wash tub 118. Washing machine appliance 100 further includes a dispenser 124 for dispensing wash fluid into wash tub 118. In addition, appliance 100 may include one or more additional dispensers for directing fluid into wash tub 118 and each dispenser may be separately controlled by one or more valves controlling flow to each dispenser independently of the others. The term "wash fluid" refers to a liquid used for washing and/or rinsing articles during an operating cycle and may include any combination of water, detergent, fabric softener, bleach, and other wash additives or treatments. As used herein, the term "cleaning cycle" includes a wash cycle, rinse cycle, spin cycle, or combinations thereof.

Wash drum 122 and cabinet 104 generally define an opening 126 (accessible through door 103) for receipt of articles for washing. Wash drum 122 rotates about a vertical axis of rotation VA (FIGS. 2, 3, and 4) powered by motor assembly 128. According to the illustrated embodiment, the axis of rotation VA is substantially parallel to the vertical direction V.

As illustrated, cabinet 104 of washing machine appliance 100 has a top panel 130, which can form a portion of cabinet 104. Top panel 130 defines an opening (FIG. 1) that coincides with opening 126 of wash tub 118 to permit a user access to wash drum 122. Door 103 is rotatably mounted to top panel 130 to permit selective access to opening 126. In particular, door 103 selectively rotates or pivots between a closed position (FIG. 1) and an open position. In the closed position, door 103 inhibits access to wash chamber 120. Conversely, in the open position, a user can access wash chamber 120. Although door 103 is illustrated as mounted to top panel 130, door 103 may alternatively be mounted to other portions of cabinet 104 or any other suitable support.

Figure 6:
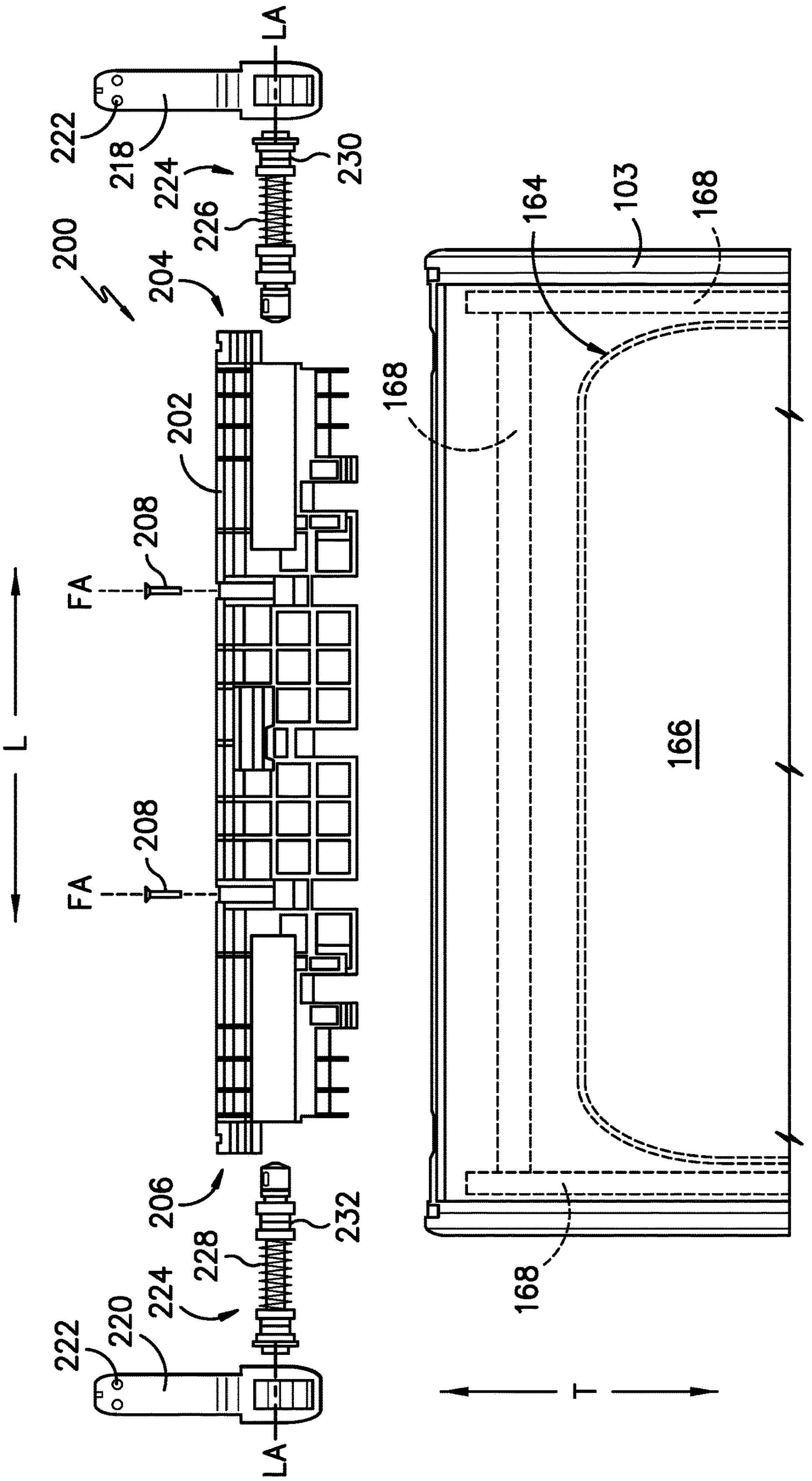
FIG. 6 is another bottom view of a portion of the exemplary door of FIG. 3 showing an exemplary service tray removed from the door and an exploded view of components supported by the service tray.

For this exemplary embodiment, door 103 forms a window 164 constructed from a transparent material 166 such as tempered glass or other materials. Window 164 allows a user to view e.g., the contents of wash chamber 120 during a cleaning cycle. In one exemplary embodiment, transparent material 166 is attached to door 103 using adhesive strips 168 (FIG. 6). Other materials and constructions may be used as well.

As best shown in FIG. 2, wash drum 122 further defines a plurality of perforations 132 to facilitate fluid communication between an interior of wash drum 122 and wash tub 118. In this regard, wash drum 122 is spaced apart from wash tub 118 to define a space for wash fluid to escape wash chamber 120. During a spin cycle, wash fluid within articles being washed (e.g., clothing) and within wash chamber 120 is urged through perforations 132 wherein it may collect in a sump 134 defined by wash tub 118. Washing machine appliance 100 further includes a pump assembly 148 (FIG. 2) that is located beneath wash tub 118 and wash drum 122 for gravity assisted flow when draining wash tub 118.

An exemplary article movement mechanism 150, including impeller 154 (FIGS. 2 and 3) and agitator post 152, is rotatably mounted within wash drum 122 to impart motion to articles and liquid in wash drum 122. More specifically, impeller 154 and agitator post 152 extend into wash drum 122 and assist agitation of articles disposed within wash drum 122 (as will be later described) during operation of washing appliance 100, e.g., to facilitate improved cleaning. For this exemplary embodiment, agitator post 152 includes a helical vane 154 extending from the outer surface 156 of agitator post 152 between bottom end 158 and top end 160 thereof. Helical vane 154 may be configured to assist the agitation of articles or support the overall desired motion thereof during a cleaning cycle. As will be understood by one of skill in the art using teachings disclosed herein, helical vane 154 may have different shapes, thickness, and other features from what is depicted in the figures and may actually include multiples sets of overlapping or non-overlapping vanes.

In different embodiments, impeller 154 and agitator post 152 may rotate separately or together. Such rotations include a single action element (i.e., oscillatory only), a double action element (oscillatory movement at one end, single direction rotation at the other end) or a triple action element (oscillatory movement plus single direction rotation at one end, single direction rotation at the other end). Impeller 154, agitator post 152, and wash drum 122 are oriented to rotate about a vertical axis of rotation VA (which is substantially parallel to vertical direction V). For example, impeller 154 and/or agitator post 152 may rotate back and forth in alternate directions about vertical axis VA during a cleaning cycle.

As stated, washing machine appliance 100 includes a motor assembly 128 in mechanical communication with wash drum 122 to selectively rotate wash drum 122 (e.g., during a wash cycle or a rinse cycle of washing machine appliance 100). In addition, motor assembly 128 may also be in mechanical communication with impeller 154 and agitator post 152. For this embodiment, impeller 154 is secured to a shaft 162 from motor assembly 128. In this manner, motor assembly 128 may be configured for selectively and independently rotating or oscillating wash drum 122, impeller 154, and/or agitator post 152 during various operating cycles of washing machine appliance 100.

Figure 3:
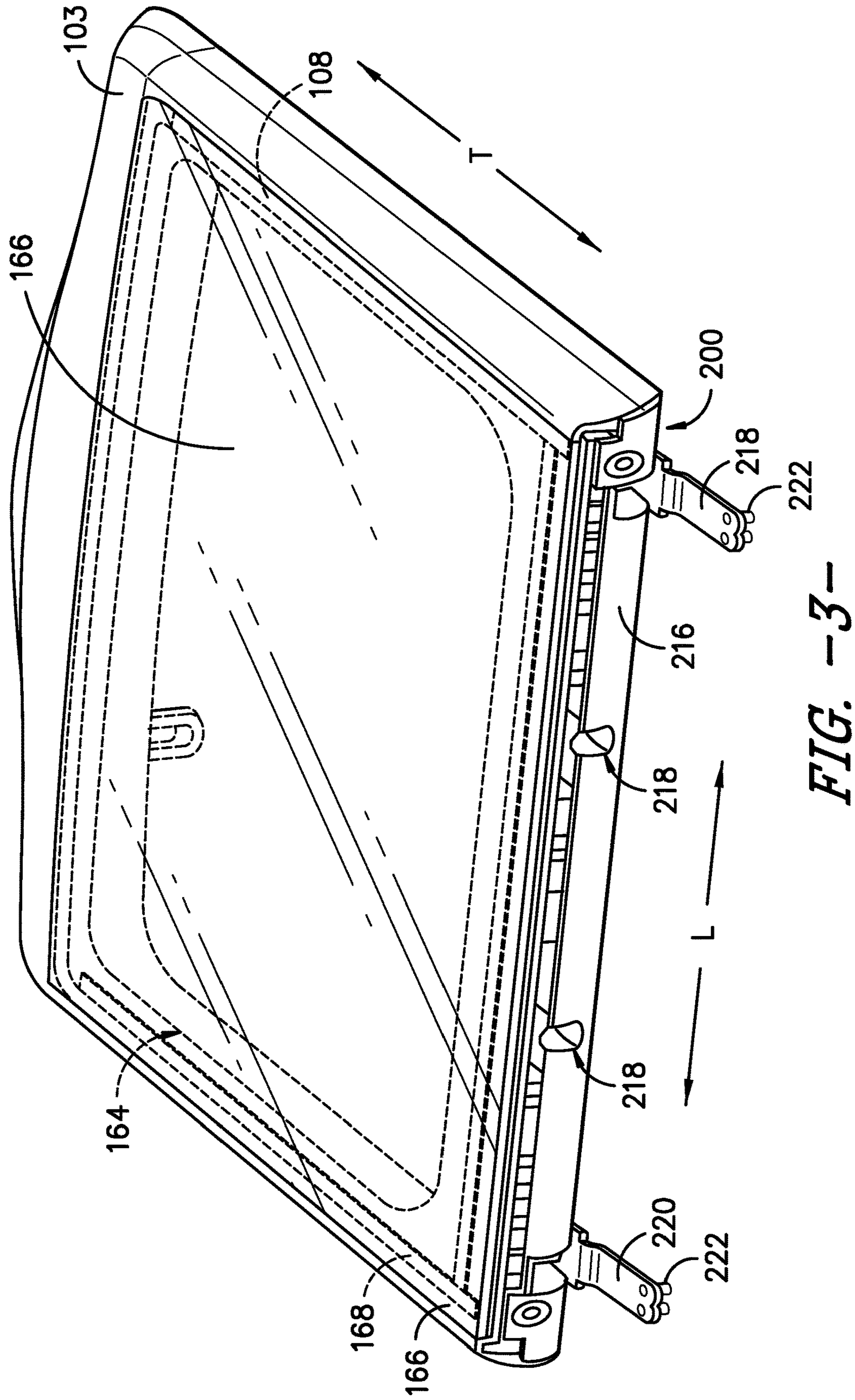
FIG. 3 provides a perspective view from the rear of an exemplary door for the washing machine of FIG. 1 with an exemplary removable service tray installed and stanchions shown in a position for a closed door.

Referring still to FIGS. 1 through 3, a control panel 138 with at least one input selector 140 (FIGS. 1 and 2) extends from top panel 130. Control panel 138 and input selector 140 collectively form a user interface input for operator selection of machine cycles and features of washing appliance 100. A display 142 of control panel 138 indicates selected features, operation mode, a countdown timer, and/or other items of interest to appliance users regarding operation.

Operation of washing machine appliance 100 is controlled by at least one controller or processing device 146 that is operatively coupled to control panel 138 for user manipulation to select washing machine cycles and features. In response to user manipulation of control panel 138, controller 146 operates the various components of washing machine appliance 100 to execute selected machine cycles and features. According to an exemplary embodiment, controller 146 may include a memory and microprocessor, such as a general or special purpose microprocessor operable to execute programming instructions or micro-control code associated with methods described herein. Alternatively, controller 146 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 138 and other components of washing machine appliance 100 may be in communication with controller 146 via one or more signal lines or shared communication busses.

During operation of washing machine appliance 100, laundry items are loaded into wash drum 122 through opening 126, and washing operation is initiated through operator manipulation of input selector 140. Water, detergent and/or other fluid additives can be added to wash tub 118 and wash drum 122 through dispenser 124 and/or other dispensers as well. Controller 146 can operate one or more valves of washing appliance 100 to provide for filling wash tub 118 and wash drum 122 to the appropriate level for the amount of articles being washed and/or rinsed. By way of example for a wash mode, once wash drum 122 is properly filled with fluid, the contents of wash drum 122 can be agitated (e.g., with article movement mechanism 150 as discussed previously) for washing of laundry items in wash drum 122. The specific operation of wash appliance 100 by controller 146 will depend on various inputs including the cycle and other settings that may be selected by the user, the amount of article placed in wash chamber 120, and other variables as will be understood by one of skill in the art using the teachings disclosed herein.

By way of continuing example, after wash tub 118 is filled and the agitation phase of the wash cycle is completed, wash tub 118 and drum 122 can be drained, e.g., by drain pump assembly 148. Laundry articles can then be rinsed by again adding fluid to wash drum 122 and tub 118 again depending on the specifics of the cleaning cycle selected by a user. The impeller 154 and/or agitator post 152 may also provide agitation within wash drum 122. One or more spin cycles may also be used as part of the cleaning process. In particular, a spin cycle may be applied after the wash cycle and/or after the rinse cycle in order to wring wash fluid from the articles being washed. During a spin cycle, wash drum 122 is rotated at relatively high speeds to help wring fluid from the laundry articles through perforations 132. After articles disposed in wash drum 122 are cleaned and/or washed, the user can remove the articles from wash drum 122, e.g., by reaching into wash drum 122 through opening 126.

In one exemplary aspect, the present invention provides a removable service tray that can facilitate servicing of the lid or door, such as exemplary door 103, and related components. In still another exemplary aspect, the present invention can also allow for improved aesthetics by allowing all or portions of such related components to be hidden from a user's view under the normal circumstances where such user is positioned at or near the front of the appliance, such as front 114 of appliance 100.

FIGS. 3 through 8 will be used for further describe an exemplary service tray 200. For this exemplary embodiment, service tray 200 includes a cartridge 202 that is removably received or attached onto door 103. Cartridge 202 extends longitudinally along lateral direction L between opposing ends 204 and 206. Cartridge 202 defines an opening 212 (FIG. 8) into interior 214 that can be enclosed with a removable cover 216 (FIG. 3). Door 103 and cartridge 202 may include various features that assist in aligning cartridge 202 into position during installation onto, and removal from, door 103. Cartridge 202 may be constructed from a variety of different materials. In one exemplary embodiment, cartridge 202 is constructed as unitary member from a nylon reinforced plastic to provide additional strength and durability.

For this exemplary embodiment, service tray 200 with cartridge 202 is received within an interior 170 (FIG. 7) formed in door 103. As will be further described, service tray 200 (including cartridge 202) is configured such that upon e.g., removal of one or more fasteners, service tray 200 can be completely taken out of the door by moving or sliding cartridge 202 along transverse direction T. Similarly, service tray 200 can be installed into interior 170 by sliding along transverse direction T.

Figure 5:
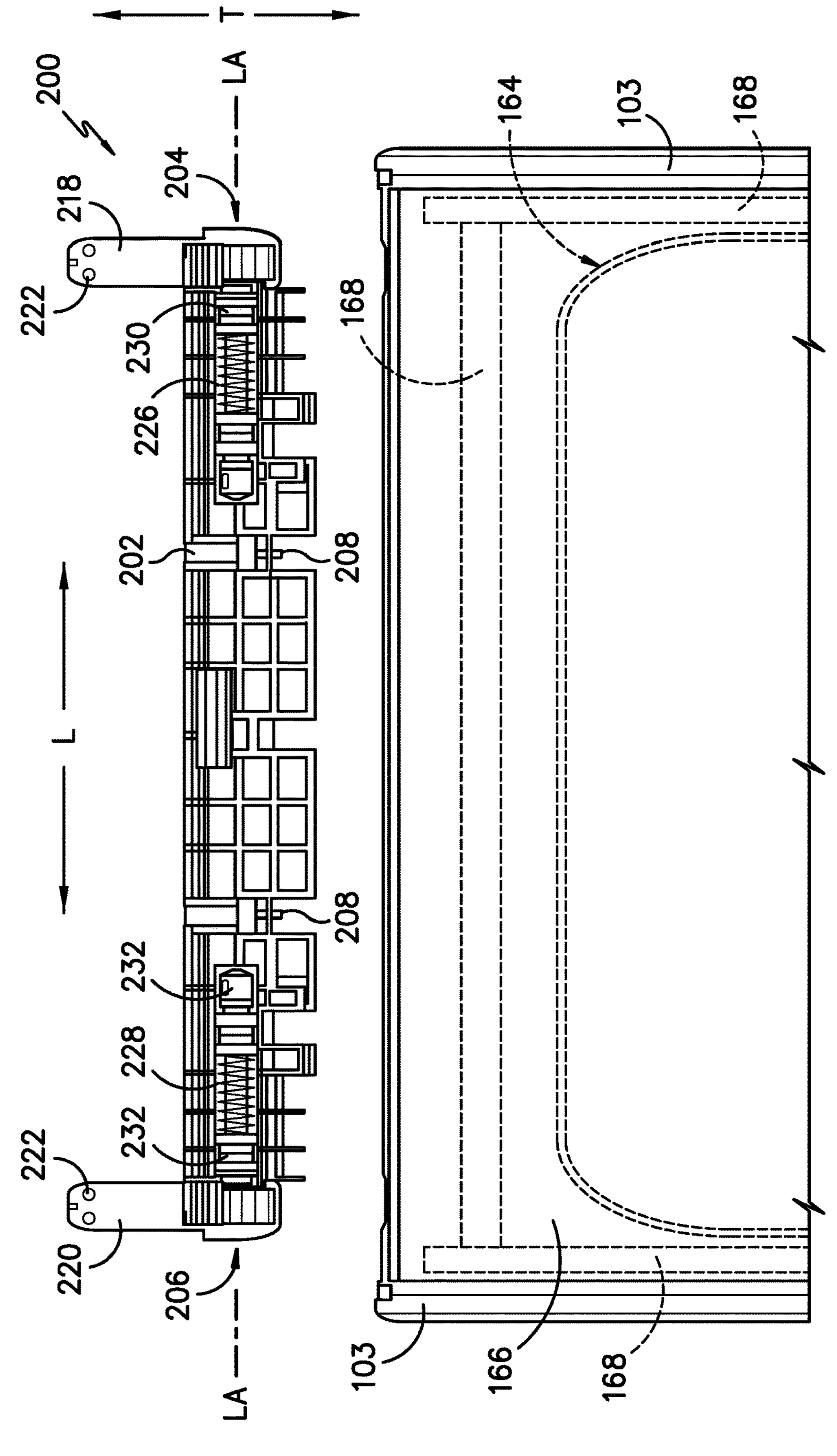
FIG. 5 is a bottom view of a portion of the exemplary door of FIG. 3 showing an exemplary service tray removed from the door.

Cartridge 202 is releasably connected to, or attached with, door 103 using one or more mechanical fasteners 208. For this exemplary embodiment, fasteners are provided as screws or bolts 208 that each have a longitudinal axis FA extending along transverse direction T (FIGS. 5 and 6). Fasteners and are threaded into screw bosses 210 (FIG. 7) affixed in door 103 and extend through fastener bosses 211 (FIG. 8) provided by cartridge 202. Fastener bosses 211 define openings or channels 213 extending along transverse direction T that orient fasteners 208 along transverse direction T and into screw bosses 210. For removal, fasteners 208 may be accessed through openings 218 (FIG. 3) in removable cover 216. While two fasteners 208 are shown, a different number of fasteners 208 may be utilized in various embodiments of the invention. Different types of fasteners may be used as well in other embodiments.

A pair of rotatable stanchions 218, 220 are positioned at opposing ends of cartridge 202 and are connected with cabinet 104. For example, stanchions 218, 220 may include fastener bosses 222 extending along vertical direction V for the receipt of removable fasteners to attach with cabinet 104. Other mechanisms may be used to attachment of stanchions 218, 220 with appliance 100 as well. Stanchions 218, 220 are positioned under control panel 138, which may be removed in order to access fasteners in bosses 222.

Figure 4:
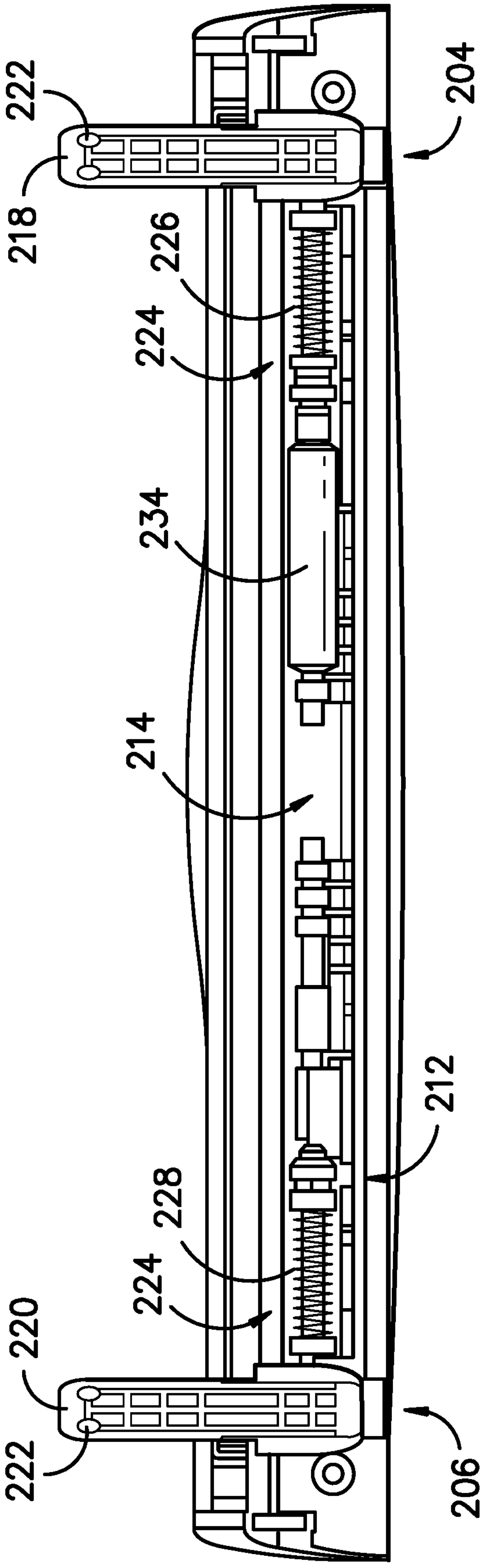
FIG. 4 is an elevation view of the rear of the exemplary door of FIG. 3 with stanchions shown in a position for an open door.

Stanchions 218, 220 are connected with a spring assembly 224 (FIGS. 4 and 5), which provides a torsional force between door 103 and stanchions 218, 220. Exerting around longitudinal axis LA, the torsional force assists in moving door 103 between the closed position for the stanchions as shown in FIG. 3 (where door 103 would lie in a horizontal plane that includes both lateral direction L and transverse direction T) and an open position for the stanchions as shown in FIG. 4 (where door 103 would be vertically upright on appliance 100).

For this exemplary embodiment, spring assembly 224 includes a pair of torsional springs 226, 228 and a pair of axles 230, 232 positioned at opposing ends 204, 206 of cartridge 202. In addition, torsional springs 226, 228 and axles 230, 232 are contained within cartridge interior 214. Stanchions 218, 220 and axles 230, 232 each rotate together about a longitudinal axis LA that is parallel to lateral direction L.

Axles 230, 232 are connected between door 103 and cabinet 104 and are positioned within springs 226, 228. The tension in each spring 226, 228 increases when door 103 is closed and decreases when door 103 is opened. As such, the tension from springs 226, 228 assists in opening door 103. Other spring configurations may be used as well.

For this exemplary embodiment, door 103 also includes a dampener 234 connected with the spring assembly 224 and configured for slowing movement of the door 103 between the open position and the closed position. In this exemplary embodiment, only one dampener 234 is connected with axles 230 but other configurations may also be used. For example, dampener 234 may contain a fluid that slows the rotation of axle 230 and therefore movement of door 103. Accordingly, dampener 234 may reduce the speed at which door 103 would otherwise close due to e.g., the effects of gravity.

As best observed in FIG. 1 for this exemplary embodiment, the components of service tray 200 including cartridge 202, spring assembly 224, and dampener 234 remain hidden from view when appliance 100 is observed by a user from front 114 of appliance 100. Such construction provides an appearance for appliance 100 that may be more aesthetically pleasing for certain users. At the same time, spring assembly 224 of tray 200 provides assistance in moving door 103 between open and closed positions.

Service tray 200 also improves the serviceability of door 103. More particularly, for this exemplary embodiment, a service technician can remove console 138, which allows access stanchions to 218, 220 and to fasteners 208 by way of openings 218. A service technician can then remove service tray 200 from door 103 by sliding along transverse direction T once fasteners 208 are loosened or removed. Although not necessary for access to tray 200, stanchions 218, 220 may be disconnected from cabinet 104 before or after the removal of service tray 200 from door 102.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A washing appliance, comprising:
- a cabinet defining a vertical direction, a lateral direction extending between opposing sides, and a transverse direction extending between a front and back;
- a wash tub positioned in the cabinet and defining a wash chamber accessed through an opening positioned over the wash chamber;
- a wash drum rotatably mounted within the wash chamber and configured for receiving articles for washing;
- a door positioned at the opening, the door configured for selectively pivoting between an open position allowing access to the wash chamber through the opening and a closed position in which the door covers the opening, the door defining an interior;
- a cartridge removably received within the interior of the door, the cartridge defining a rear-facing opening providing access to a cartridge interior, the cartridge extending longitudinally along the lateral direction between opposing ends;
- a plurality of fasteners positioned in the cartridge interior and releasably attaching the cartridge with the door;
- a pair of rotatable stanchions positioned at the opposing ends of the cartridge, the rotatable stanchions removably connected with the cabinet; and
- a spring assembly positioned within the interior of the cartridge and connected with the pair of rotatable stanchions, wherein the spring assembly is configured to assist in moving the door to the open position, wherein the spring assembly comprises a pair of axles positioned at opposing ends of the cartridge, the pair of axles connected with the pair of rotatable stanchions so that the pair of axles and pair of rotatable stanchions rotate together about an axis that is parallel to the lateral direction; and
- wherein the pair of axles are contained entirely within the cartridge interior and are positioned within the pair of torsional springs.

2. The washing appliance of claim 1, wherein the cartridge further comprises a plurality of fastener bosses configured for orienting the fasteners along the transverse direction.

3. The washing appliance of claim 1, wherein the cartridge further comprises a nylon reinforced plastic.

4. The washing appliance of claim 1, where the cartridge is configured such that upon removal of the fasteners, the cartridge can be completely removed from the door by sliding along the transverse direction.

5. The washing appliance of claim 1, wherein the spring assembly further comprises a pair of torsional springs, contained entirely within the cartridge interior, positioned at opposing ends of the cartridge and configured to resist movement of the door into the closed position.

6. The washing appliance of claim 1, wherein the fasteners comprise screws or bolts each having a longitudinal axis oriented along the transverse direction when the cartridge is received into the door.

7. The washing appliance of claim 1, wherein the door comprises a transparent material forming a window through which a user can observe the wash chamber.

8. A washing appliance, comprising:
- a cabinet;
- a wash tub supported by the cabinet and defining a wash chamber accessed through an opening positioned over the wash chamber;
- a wash drum rotatably mounted within the wash chamber and configured for receiving articles for washing;
- a door positioned at the opening, the door configured for selectively pivoting about a longitudinal axis between an open position and a closed position;
- a cartridge removably attached to the door, the cartridge having a top surface covered at least partially by the door, the cartridge having a cartridge interior, the cartridge extending longitudinally along a lateral direction between opposing ends, wherein the door defines an interior near the longitudinal axis into which the cartridge is removably received;
- at least one fastener releasably attaching the cartridge with the door;
- a pair of rotatable stanchions positioned at the opposing ends of the cartridge, the stanchions removably connected with the cabinet; and
- a spring assembly positioned within the cartridge interior and connected with the pair of rotatable stanchions, wherein the spring assembly provides assistance in moving the door to the open position, wherein the spring assembly comprises a pair of axles positioned at opposing ends of the cartridge and contained entirely within the cartridge interior, the pair of axles connected with the pair of rotatable stanchions so that the pair of axles and pair of rotatable stanchions rotate together about an axis that is parallel to the lateral direction.

9. The washing appliance of claim 8, wherein the spring assembly further comprises a pair of torsional springs positioned at opposing ends of the cartridge, contained entirely within the cartridge interior, and configured to resist movement of the door into the closed position.

10. The washing appliance of claim 8, wherein the pair of axles are positioned within the pair of torsional springs.

11. The washing appliance of claim 8, further comprising a dampener connected with the spring assembly and configured for slowing movement of the door between the open position and the closed position.

12. The washing appliance of claim 8, wherein the least one fastener comprises a plurality of fasteners, and wherein the cartridge further comprises a plurality of fastener bosses configured for orienting the plurality of fasteners along the transverse direction and into the door.

13. The washing appliance of claim 12, where the cartridge is configured such that upon removal of the plurality of fasteners, the cartridge can be completely taken out of the door by moving the cartridge along the transverse direction.

14. The washing appliance of claim 8, wherein the at least one fastener comprises screws or bolts each having a longitudinal axis oriented along the transverse direction when the cartridge is received into the door.

15. The washing appliance of claim 8, wherein the door comprises a transparent material forming a window through which a user can observe the wash chamber.

16. A washing appliance, comprising:

a cabinet defining a vertical direction, a lateral direction extending between opposing sides, and a transverse direction extending between a front and back;

a wash tub positioned in the cabinet and defining a wash chamber accessed through an opening positioned over the wash chamber;

a wash drum rotatably mounted within the wash chamber and configured for receiving articles for washing;

a door positioned at the opening, the door configured for selectively pivoting between an open position allowing access to the wash chamber through the opening and a closed position in which the door covers the opening;

a cartridge removably connected with the door, the cartridge defining a rear-facing opening providing access to a cartridge interior, the cartridge extending longitudinally along the lateral direction between opposing ends;

a plurality of fasteners positioned in the cartridge interior and releasably attaching the cartridge with the door;

a pair of rotatable stanchions positioned at the opposing ends of the cartridge, the rotatable stanchions removably connected with the cabinet; and a spring assembly positioned within the interior of the cartridge, the spring assembly comprising a pair of axles and a pair torsional springs, wherein each of the rotatable stanchions is connected to an end of one of the axles at opposing ends of the cartridge so that the pair of axles and pair of rotatable stanchions rotate together about an axis that is parallel to the lateral direction.

* * * * *